(12) United States Patent
Oun

(10) Patent No.: US 12,179,663 B2
(45) Date of Patent: Dec. 31, 2024

(54) HORN ADAPTIVE ELECTRICAL CONNECTION UNIT FOR QUICK-RELEASE STEERING WHEEL ASSEMBLY

(71) Applicant: Phase 2 Motortrend Inc, Chino, CA (US)

(72) Inventor: Wayne Oun, Chino, CA (US)

(73) Assignee: Phase 2 Motortrend Inc

( * ) Notice: Subject to any disclaimer, the term of this patent is extended or adjusted under 35 U.S.C. 154(b) by 146 days.

(21) Appl. No.: 18/113,260

(22) Filed: Feb. 23, 2023

(65) Prior Publication Data

US 2024/0286547 A1  Aug. 29, 2024

(51) Int. Cl.
  *B62D 1/10* (2006.01)
  *B60Q 5/00* (2006.01)
  *H01H 13/14* (2006.01)
  *H01H 13/20* (2006.01)

(52) U.S. Cl.
  CPC .............. *B60Q 5/003* (2013.01); *B62D 1/10* (2013.01); *H01H 13/14* (2013.01); *H01H 13/20* (2013.01)

(58) Field of Classification Search
  CPC .......... B60Q 5/003; B62D 1/10; H01H 13/14; H01H 13/20
  USPC ........... 74/484 H; 280/771; 200/61.55, 61.56
  See application file for complete search history.

(56) References Cited

U.S. PATENT DOCUMENTS

| | | | | | |
|---|---|---|---|---|---|
| 2,181,783 | A | * | 11/1939 | Creson | B60Q 5/003 200/61.55 |
| 2,616,002 | A | * | 10/1952 | Junker | B60Q 5/003 200/61.55 |
| 2,631,204 | A | * | 3/1953 | Kibiger | B60Q 5/003 74/552 |
| 2,729,713 | A | * | 1/1956 | Berner | B60Q 5/003 200/61.54 |

FOREIGN PATENT DOCUMENTS

GB          2490741 A  * 11/2012  ............... B62D 1/10

* cited by examiner

*Primary Examiner* — William C Joyce
(74) *Attorney, Agent, or Firm* — Elizabeth Yang

(57) ABSTRACT

A horn adaptive electrical connection unit for quick-release steering wheel assembly is provided. A horn adaptive electrical connection unit is composed of a horn contact pole, a contact pole holder, and a horn spring. The horn adaptive electrical connection unit is installed in the quick-release steering wheel assembly. The horn spring may provide support for the contact pole holder as well as the horn contact pole, thus, a floating electrical connection between the horn button and the automotive horn circuit and adapting to different thicknesses of horn buttons is created. The floating electrical connection setup simplifies operation by eliminating the need for using tools to wire or remove wires when installing or replacing the steering wheel. Compared to traditional horn electrical connection units, the present horn adaptive electrical connection unit is easier to use, more reliable, and much faster to be installed and detached.

18 Claims, 7 Drawing Sheets

HORN ADAPTIVE ELECTRICAL CONNECTION UNIT FOR QUICK-RELEASE STEERING WHEEL ASSEMBLY

FIELD OF THE INVENTION

The present invention relates to a horn adaptive electrical connection unit. More so, a horn adaptive electrical connection unit for quick-release steering wheel assembly is introduced herein.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

A quick release steering wheel is a type of steering wheel that can be easily and quickly detached from the steering column of a vehicle. This is usually achieved through the use of a locking mechanism, such as cams, push rings, pull rings, or pins. Quick release steering wheels are popular in racing, as they allow the driver to quickly exit the vehicle in case of emergency. They are also commonly used in street-legal race cars and high-performance vehicles to facilitate easy access and customization.

The main barrier to the disassembly performance of existing quick-release steering wheels is the horn button. The steering wheel can be attached and detached by mechanical construction. However, the horn button on the steering wheel needs to be electrically connected to the vehicle horn circuit to trigger the vehicle horn when needed.

A typical horn circuit consists of two sub-circuits, one connecting the positive contact of the horn button to the positive terminal on the automotive horn circuit; the other connecting the negative contact of the horn button to the negative terminal on the automotive horn circuit.

The existing solution is usually to connect two wires at the horn button contact to the positive and negative terminals of the vehicle horn circuit, as in patent U.S. Pat. No. 7,527,293B. The disadvantage of this method is that after each installation of the steering wheel, it needs to be wired, which will consume some time, and the reliability of the wiring is not guaranteed. The speed of quick-release steering wheel with horn is greatly affected by the fact that the wiring has to be handled during installation and removal.

Alternatively, a way to avoid wiring every time is also provided, i.e. the horn button of the vehicle is not set on the steering wheel, thus there is no need to change the horn button or wiring when changing the steering wheel. However, the disadvantage of this method is also obvious, the horn button set outside the steering wheel makes the driver need additional operation, which may lead to the potential risk of accidents.

To solve the above problems, the present invention is proposed. The present invention creates a horn adaptive electrical connection unit that can be installed in the steering wheel without the need for wiring each time. It has the advantage of simpler disassembly and more reliable electrical connections. This patent provides a solution that can be quickly removed without handling wiring, and the horn functions no differently than a normal steering wheel.

SUMMARY

Illustrative embodiments of the disclosure are generally directed to a horn adaptive electrical connection unit for quick-release steering wheel assembly.

A horn adaptive electrical connection unit for quick-release steering wheel assembly may be provided. The quick-release steering wheel assembly may have a steering shaft connecting hub, a steering wheel adapter, and a spring-loaded sliding release sleeve for locking and releasing the steering shaft connecting hub and the steering wheel adapter.

The horn adaptive electrical connection unit may include:
a horn contact pole; wherein one end of the horn contact pole may be for electrical connection to a horn button, another end of the horn contact pole may be for electrical connection to an automotive horn circuit;
a contact pole holder that may hold the horn contact pole; the contact pole holder may slide freely in a hollow central shaft of the steering shaft connecting hub;
a horn spring; one end of the horn spring may rest against the bottom of the contact pole holder, another end of the horn spring rest against the inner bottom surface of the hollow central shaft;
the horn spring may provide support for the contact pole holder as well as the horn contact pole, thus creating a floating electrical connection between the horn button and the automotive horn circuit and adapting to different thicknesses of horn buttons.

The steering wheel adapter and the steering shaft connecting hub may be electrically conductive; another electrical connection from the horn button may be transferred through the steering wheel adapter and the steering shaft connecting hub to the automotive horn circuit.

The portion of the horn contact pole in contact with the contact pole holder may be provided with an insulating layer or insulating coating.

The contact pole holder is made of insulating material.

The hollow central shaft may include a stopper; the stopper is mounted on the upper part within the hollow central shaft.

The horn contact pole may be shaped as a stepped shaft, with a step set on the horn contact pole. The horn contact pole holder may be provided with a holding cavity to accommodate one end of the step and may hold the horn contact pole to synchronize movement with it; the stopper may be provided with a central hole to rest against another end of the step and may limit the movement of the horn contact pole the hollow central shaft.

A horn signal wire may provide an electrical connection between the automotive horn circuit and one end of the horn contact pole.

The outer surface of the horn signal wire may be covered with insulating material.

A first set of threaded holes for PCD bolt pattern of 6×70 mm and a second set of threaded holes for PCD bolt pattern of 6×74 mm may be evenly distributed on the steering shaft connecting hub; threaded holes in the same set may not be adjacent to each other.

A third set of threaded holes for PCD bolt pattern of 6×70 mm and a fourth set of threaded holes for PCD bolt pattern of 6×74 mm may be evenly distributed on the steering wheel adapter; threaded holes in the same set may not be adjacent to each other.

The hollow central shaft may be fixed at center of the steering shaft connecting hub; the hollow central shaft may have a peripheral recess. The steering wheel adapter may include a disk portion and a hollow cylinder portion extending from the disk portion. The upper surface of the disk portion may be attached to a steering wheel; the hollow cylinder portion may have a plurality of peripheral ball mounting holes therethrough, with the steering wheel adapter slidably engaging the steering shaft connecting hub. The disk portion may be hollow to accommodate the horn button; the hollow interiors of the disk portion and the hollow cylinder portion may be connected.

A plurality of locking balls with the same number as the peripheral ball mounting holes may be disposed within the peripheral ball mounting holes.

The spring-loaded sliding release sleeve may slidably extend over the steering wheel adapter, thereby retaining the locking balls such that when the spring-loaded sliding release sleeve may be at rest under influence of spring loading, the locking balls may be forced into the peripheral recess of the hollow central shaft and interface with the peripheral ball mounting holes of the steering wheel adapter, thus securely locking the steering wheel adapter to the steering shaft connecting hub. When manually urged away the spring-loaded sliding release sleeve from a steering shaft, the locking balls may be freed, thereby may permit movement away from the peripheral recess wherein the locking balls fully extend into the peripheral ball mounting holes releasing the steering wheel adapter from the steering shaft connecting hub.

The number of locking balls may be 4, and the peripheral ball mounting holes may be evenly positioned on the same periphery.

The hollow central shaft may be a hollow spline shaft with external spline teeth; the hollow cylinder portion may have corresponding internal spline teeth coupled to the hollow spline shaft.

At least one of the external spline teeth may have a different size than other external spline teeth.

An operating disk may be provided at the upper portion of the spring-loaded sliding release sleeve.

The portion of the operating disk close to the hollow cylinder portion of the steering wheel adapter may form a first annular cavity. A tension spring may be set in the first annular cavity with one end resting against the bottom surface of the disk portion of the steering wheel adapter and another end against the inner bottom surface of the first annular cavity.

The lower portion of the spring-loaded sliding release sleeve may form a second annular cavity with a truncated cone cavity at the top and a cylindrical cavity at the bottom. When the locking balls are forced into the peripheral recess of the hollow central shaft and interface with the peripheral ball mounting holes of the steering wheel adapter, the inner surface of the truncated cone cavity may block the movement of the locking balls leaving the peripheral ball mounting holes. When manually urged away the spring-loaded sliding release sleeve from the steering shaft, the inner surface of the truncated cone cavity may slip away from the peripheral ball mounting holes, thus the locking balls may enter the cylindrical cavity at the bottom.

The hollow cylinder portion of the steering wheel adapter may have an annular recess on outer wall of portion adjacent to the cylindrical cavity of the spring-loaded sliding release sleeve; a locking clip may be provided in the annular recess to prevent the locking balls from leaving the cylindrical cavity.

The operating disk may be provided with a plurality of weight reduction holes.

The hollow central shaft may be detachable from the steering shaft connecting hub. These, as well as other components, steps, features, objects, benefits, and advantages, will now become clear from a review of the following detailed description of illustrative embodiments, the accompanying drawings, and the claims.

Other systems, devices, methods, features, and advantages will be or become apparent to one with skill in the art upon examination of the following drawings and detailed descriptions. It is intended that all such additional systems, methods, features, and advantages be included within this description, be within the scope of the present disclosure, and be protected by the accompanying claims and drawings.

BRIEF DESCRIPTION OF THE DRAWINGS

The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

The same reference numerals refer to the same parts throughout the various views of the drawings.

DETAILED DESCRIPTION OF ILLUSTRATIVE EMBODIMENTS

Figure 1:
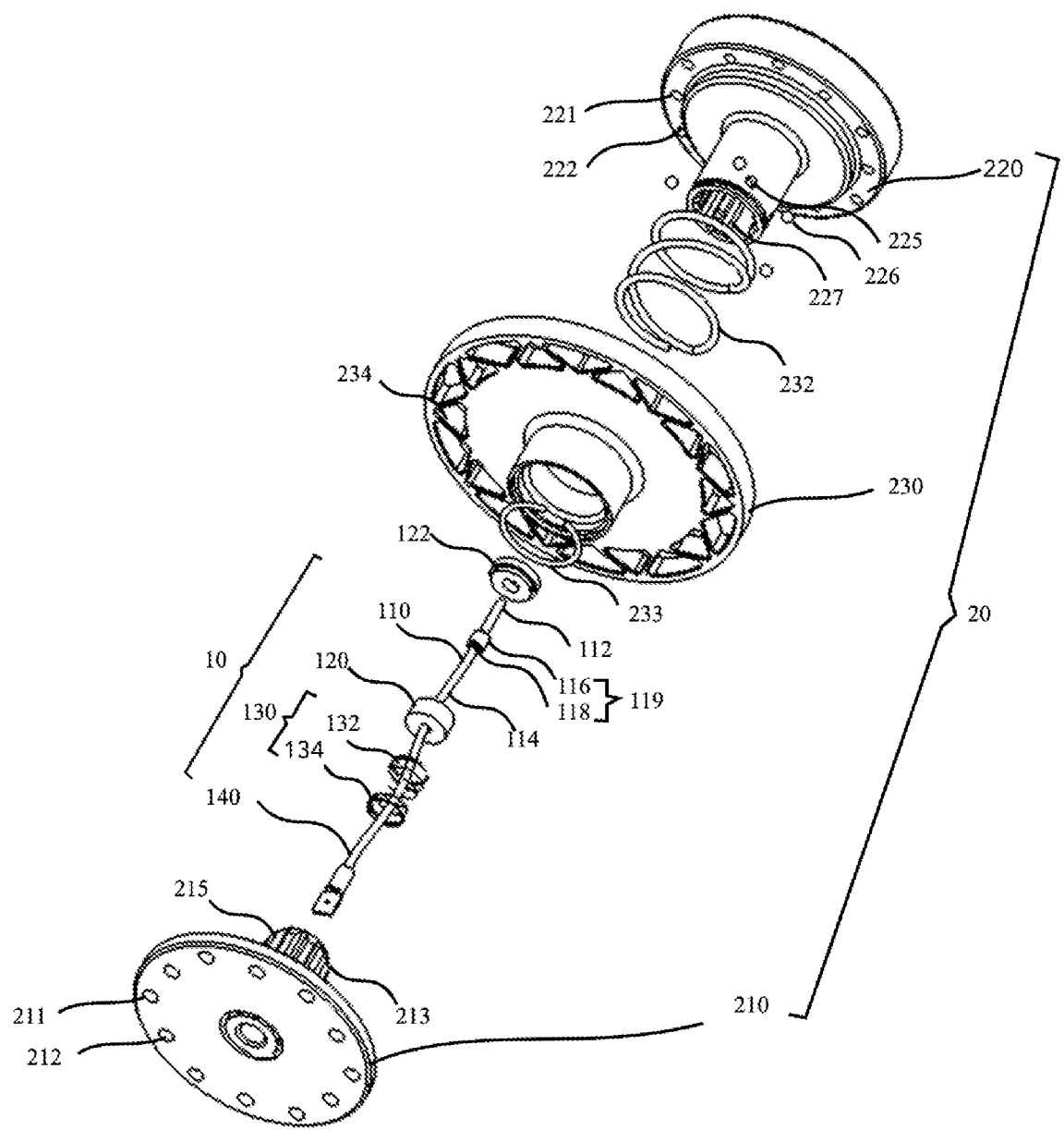
FIG. 1 illustrates an exploded view with a horn adaptive electrical connection unit and the unit installed in a quick-release steering wheel assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in the drawings. Furthermore, there is no intention to be bound by any expressed or implied theory presented in the preceding technical field, background, summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

FIG. 1 illustrates an exploded view with a horn adaptive electrical connection unit and the unit installed in a quick-release steering wheel assembly.

The quick-release steering wheel assembly 20 is composed of a steering shaft connection hub 210, a steering wheel adapter 220, and a spring-loaded sliding release sleeve 230 for locking and releasing the steering shaft connection hub 210 and the steering wheel adapter 220.

The horn adaptive electrical connection unit 10 is mainly composed of a horn contact pole 110, a contact pole holder 120, and a horn spring 130. The upper end 112 of the horn contact pole 110 is for electrical connection to positive/negative contacts of a horn button (not shown), and the lower end 114 of the horn contact pole 110 is for electrical connection to the corresponding positive/negative automotive horn circuit. This forms the first sub-circuit of the horn circuit. The steering wheel adapter 220 and the steering shaft connection hub 210 are electrically conductive; another electrical connection from negative/positive contacts of the horn button is transferred through the steering wheel adapter 220 and the steering shaft connection hub 210 to the corresponding negative/positive contacts automotive horn circuit. This forms the second sub-circuit of the horn circuit.

The contact pole holder 120 holds the horn contact pole 110 and slide together with the horn contact pole 110. The contact pole holder 120 slides freely in a hollow central shaft 213 of the steering shaft connection hub 210.

The upper end of the horn spring 130 rests against the bottom of the contact pole holder 120, and the other end of the horn spring 130 rests against the inner bottom surface of the hollow central shaft 213.

The horn spring 130 provides support for the contact pole holder 120 as well as the horn contact pole 110, thus creating a floating electrical connection between the horn button and the automotive horn circuit. The height of the conductive contact location at the bottom of the horn button may vary for different thicknesses. The floating electrical connection mentioned above always keeps the contacts of the electrical contacts of the horn button in contact with the upper end 112 of the horn contact pole 110. This allows the adaptation of horn buttons of different thicknesses.

When applying the present horn adaptive electrical connection unit for quick-release steering wheel assembly, first fix the steering shaft connection hub 210 with the steering shaft of the vehicle, then put the steering wheel adapter 220 with a steering wheel onto the steering shaft connection hub 210, the spring-loaded sliding release sleeve 230 then lock the steering shaft connection hub 210 and the steering wheel adapter 220 together. At the same time, the horn contact pole 110 is constantly connected between one contact of the horn button and the automotive horn circuit without wiring.

In order to prevent a short circuit, the portion of the horn contact pole 110 in contact with the contact pole holder 120 is provided with an insulating layer or insulating coating. Alternatively, the contact pole holder 120 is made of insulating material.

In another embodiment, the hollow central shaft 213 comprises a stopper 122; the stopper 122 is mounted on upper part within the hollow central shaft 213. The horn contact pole 110 is shaped as a stepped shaft, with a step 119 set on the horn contact pole 110. The horn contact pole holder 120 is provided with a holding cavity to accommodate one end 118 of step 119 and hold the horn contact pole 110 to synchronize movement with it; the stopper 122 is provided with a central hole to rest against another end 116 of step 119 and limit the movement of the horn contact pole 110 in the hollow central shaft 213. The horn contact pole holder 120 holds the horn contact pole 110 and moves together with the horn contact pole 110 synchronously along the hollow central shaft 213. The central hole in the stopper 122 allows one end 112 of the horn contact pole 110 to pass through the stopper 122 to contact the conductive portion of the horn button and limits the movement range of the horn contact pole 110 and the horn contact pole holder 120. The stopper 122 limits the movement of the horn contact pole 110 in the direction of the axis along the hollow central shaft 213, preventing it from sliding out of the top of the hollow central shaft 213. This setup facilitates machining and installation, and the replacement of parts as well.

In another embodiment, a horn signal wire 140 provided an electrical connection between the automotive horn circuit and one end 114 of the horn contact pole 110. The lower end of the horn signal wire 140 has a plug that can be quickly attached as shown in FIG. 1. To prevent a short circuit, the outer surface of the horn signal wire 140 is covered with insulating material.

The common steering shaft on the market has two sizes of bolts, but the common steering shaft connection hub has only one size of threaded holes for bolts. In order to improve the applicability of quick-release devices, in another embodiment, two sets of different sizes of threaded holes configuration are provided. The first set of threaded holes 221 is for a Pitch Circle Diameter (PCD) bolt pattern of 6×70 mm and the second set of threaded holes 222 is for a PCD bolt pattern of 6×74 mm. The holes are evenly distributed on the steering shaft connection hub 210. The threaded holes in the same set are not adjacent to each other.

Similarly, the common steering wheel on the market has two sizes of bolts, but the common steering wheel adapter has only one size of threaded holes for bolts. In order to improve the applicability of quick-release devices, in another embodiment, two sets of different sizes of threaded holes configuration are provided. The third set of threaded holes 211 for a Pitch Circle Diameter (PCD) bolt pattern of 6×70 mm and a fourth set of threaded holes 212 for a PCD bolt pattern of 6×74 mm are evenly distributed on the steering wheel adapter 220; threaded holes in the same set are not adjacent to each other.

As a result, the quick-release steering wheel assembly described can be adapted to match all common steering wheels and steering shafts on the market.

Figure 2:
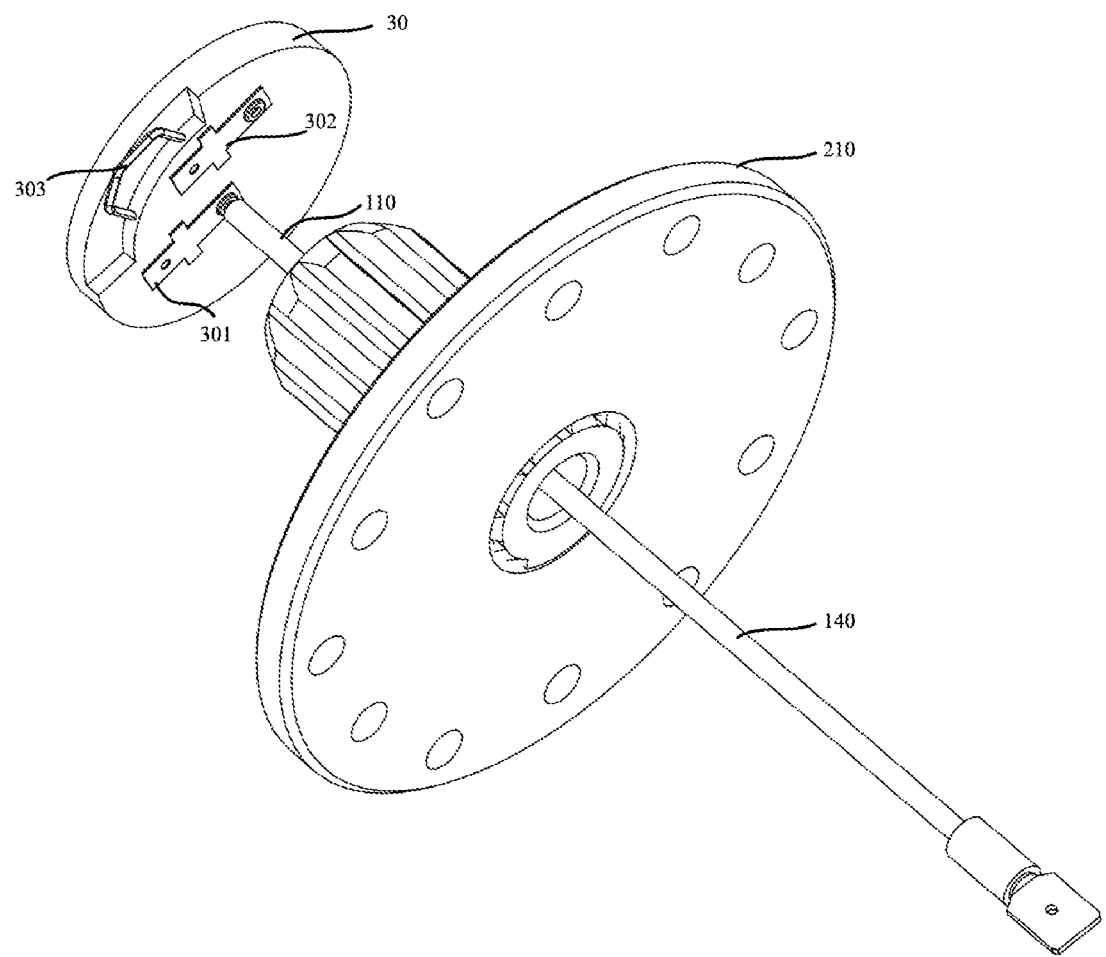
FIG. 2 illustrates the horn button and the electrical connection between the horn contact pole and the horn button.

FIG. 2 illustrates the horn button and the electrical connection between the horn contact pole and the horn button.

The horn button 30 is mounted on the top inside the steering wheel adapter 220 with a common button (not shown) on the top surface of a horn button holder. A first conductive portion 301 and a second conductive portion 302 are on the bottom surface of the horn button holder. A second conductive extension 303 is positioned on the side of the horn button 30.

The horn button 30 is fixed inside the steering wheel adapter 220, and when the assembly consisting of the steering wheel adapter 220 and the spring-loaded sliding release sleeve 230 is mounted on the steering shaft connection hub 210, the top of the horn contact pole 110 set inside the steering shaft connection hub 210 is in contact with the first conductive portion 301 at the bottom of the horn button 30. The spring 130 elastic force is always able to force the horn contact pole 110 to remain in contact with the first conductive portion 301 at all times, even if the thickness of the horn button 30 varies from one to another.

The second conductive portion 302 is electrically connected to the second conductive extension 303. But they both remain insulated from the first conductive portion 301 unless the horn button is pressed. The first conductive portion 301 and the second conductive portion 302 may be made of conductive metal sheets. The second conductive extension 303 can be made of conductive metal wire.

The circuit of horn control circuit is as follows. The first conductive portion 301, the horn contact pole 110, and the horn signal wire 140 are connected to the positive terminal of the horn control circuit. The second conductive portion 302 and the second conductive extension 303 are connected to the negative terminal (ground) of the horn control circuit. Wherein, the second conductive extension 303 is connected to the inner wall of 220 and electrically connected. The steering wheel adapter 220 and the steering shaft connection hub 210 are made of conductive material. The steering wheel adapter 220, when connected to 210, conducts electricity from the second conductive portion 302 to the negative terminal (ground) connected to the steering shaft connection hub 210. When the horn button is pressed, the second conductive portion 302 and the first conductive portion 301 are electrically connected. That is, the control circuit of the horn conducts and the horn sounds.

FIG. 1 and FIGS. 3A-3C also illustrate the details of the quick-release steering wheel assembly. The hollow central shaft 213 is fixed at the center of the steering shaft connection hub 210; the hollow central shaft 213 has a peripheral recess 214.

Figure 4A:
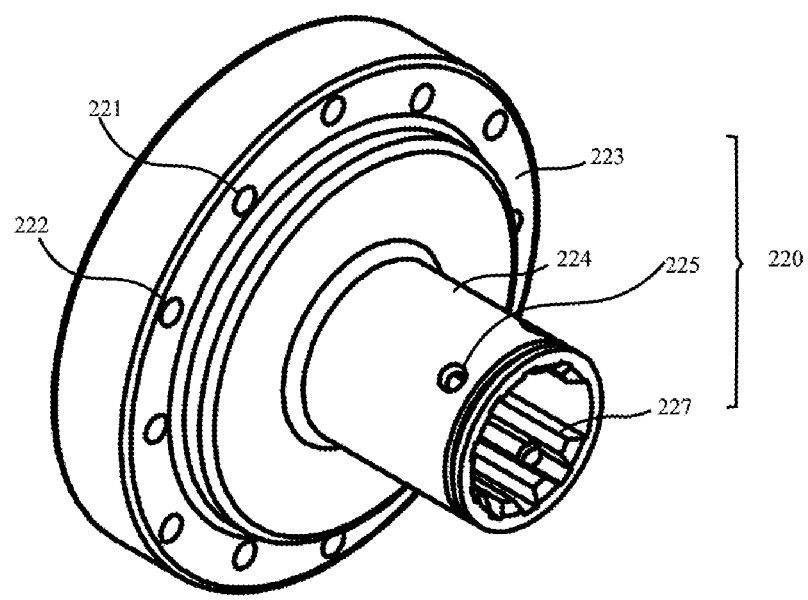
FIG. 4A and FIG. 4B illustrate a schematic view and a front view of the steering wheel adapter.
Figure 4B:
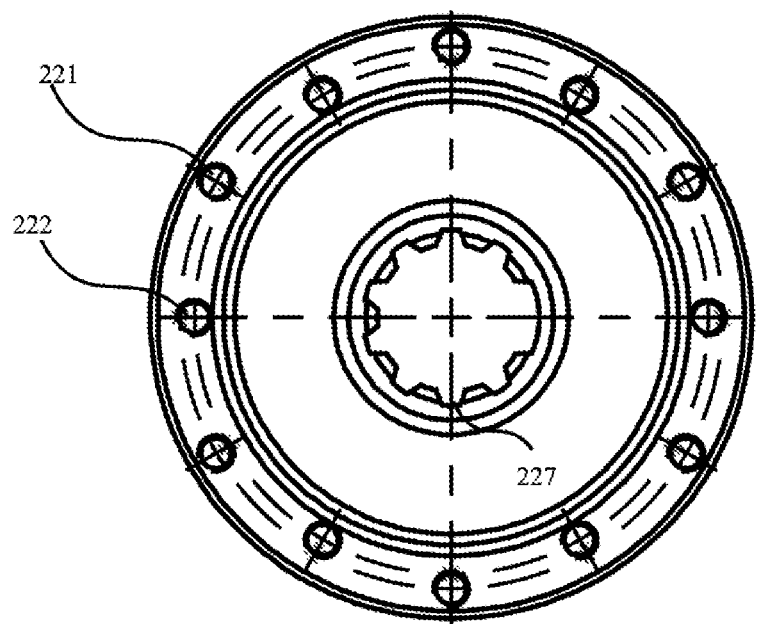

FIG. 4A and FIG. 4B illustrate a schematic view and a front view of the steering wheel adapter.

The steering wheel adapter 220 includes a disk portion 223 and a hollow cylinder portion 224 extending from the disk portion 223. The upper surface of the disk portion 223 is attached to the steering wheel; the hollow cylinder portion 224 has a plurality of peripheral ball mounting holes 225 therethrough, with the steering wheel adapter 220 slidably engaging the steering shaft connection hub 210. The disk portion 223 is hollow to accommodate the horn button 30. The inner wall of the disk portion 223 is contacted with the second conductive extension 303 of the horn button 30. The hollow interiors of the disk portion 223 and the hollow cylinder portion 224 are connected.

A plurality of locking balls 226 with the same number as the peripheral ball mounting holes 225 disposed within the peripheral ball mounting holes 225.

Figure 3A:
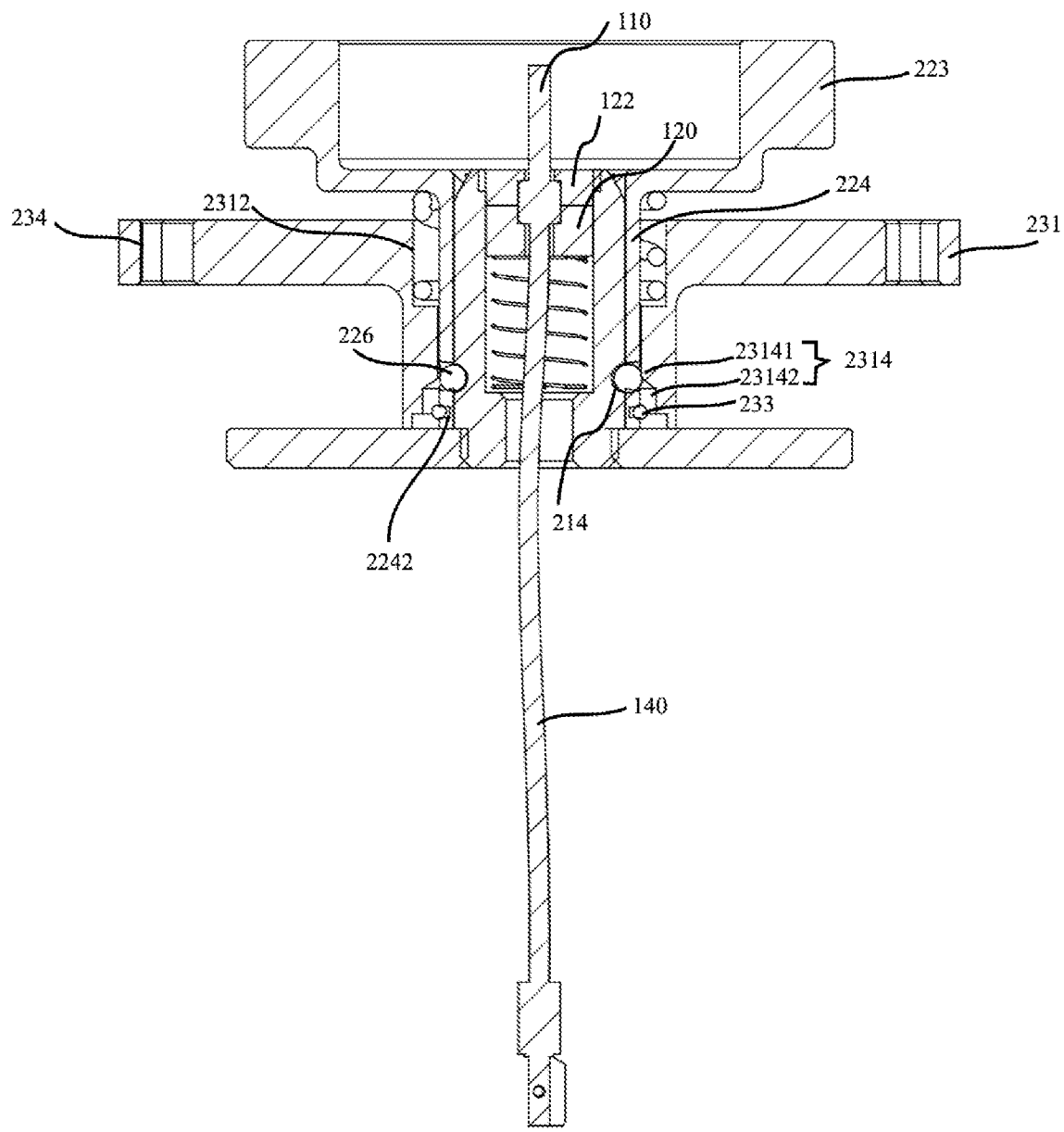
FIG. 3A illustrates a cross-sectional view with a horn adaptive electrical connection unit and the unit installed in a quick-release steering wheel assembly in a locking state.

FIG. 3A illustrates a cross-sectional view with a horn adaptive electrical connection unit and the unit installed in a quick-release steering wheel assembly in a locking state. The spring-loaded sliding release sleeve 230 slidably extends over the steering wheel adapter 220, thereby retaining the locking balls 226 such that when the spring-loaded sliding release sleeve 230 is at rest under influence of spring loading, the locking balls 226 are forced into the peripheral recess 214 of the hollow central shaft 213 and interface with the peripheral ball mounting holes 225 of the steering wheel adapter 220, thus securely locking the steering wheel adapter 220 to the steering shaft connection hub 210.

Figure 3B:
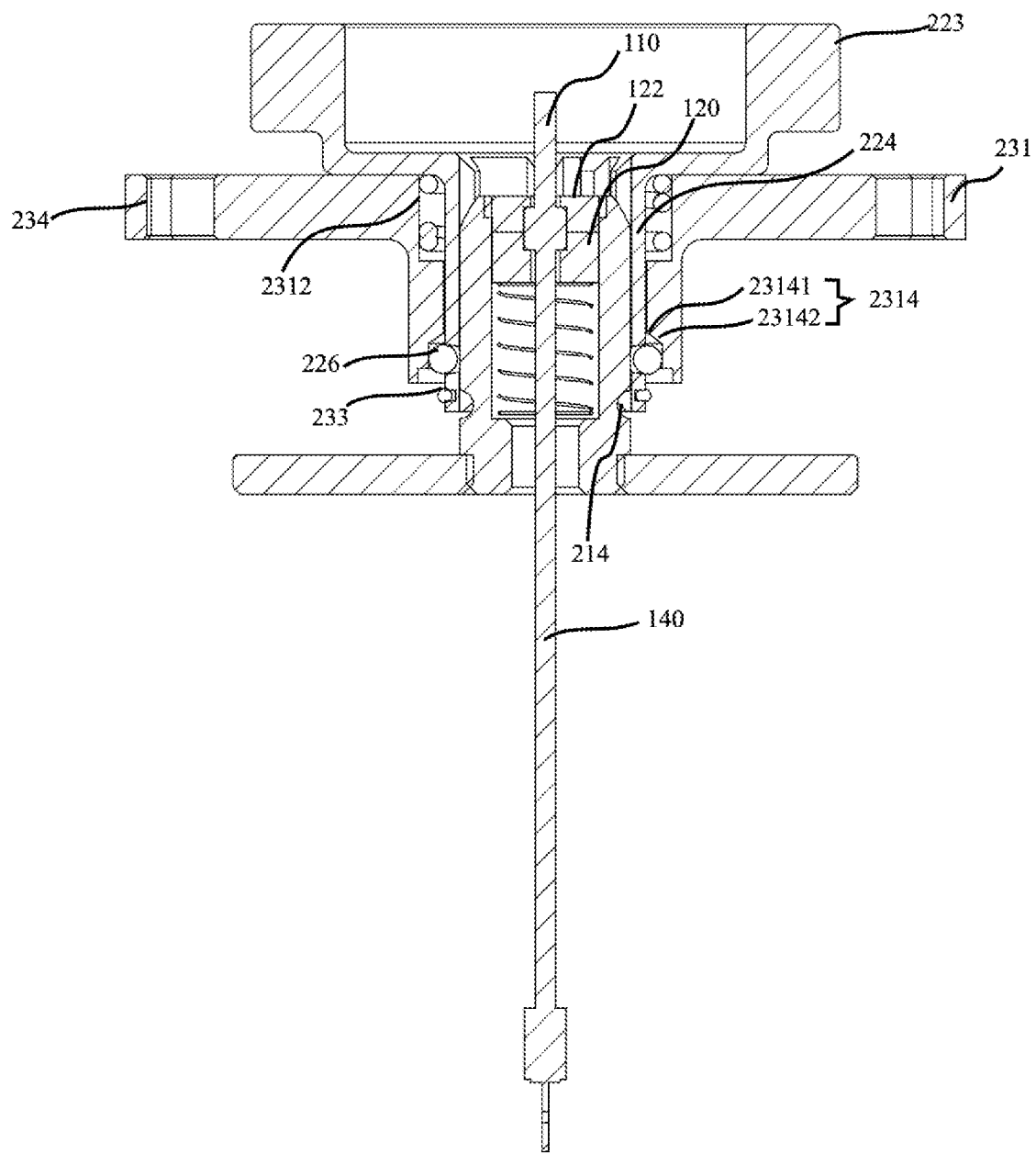
FIG. 3B illustrates a cross-sectional view with a horn adaptive electrical connection unit and the unit installed in a quick-release steering wheel assembly in an unlocked state.
Figure 3C:
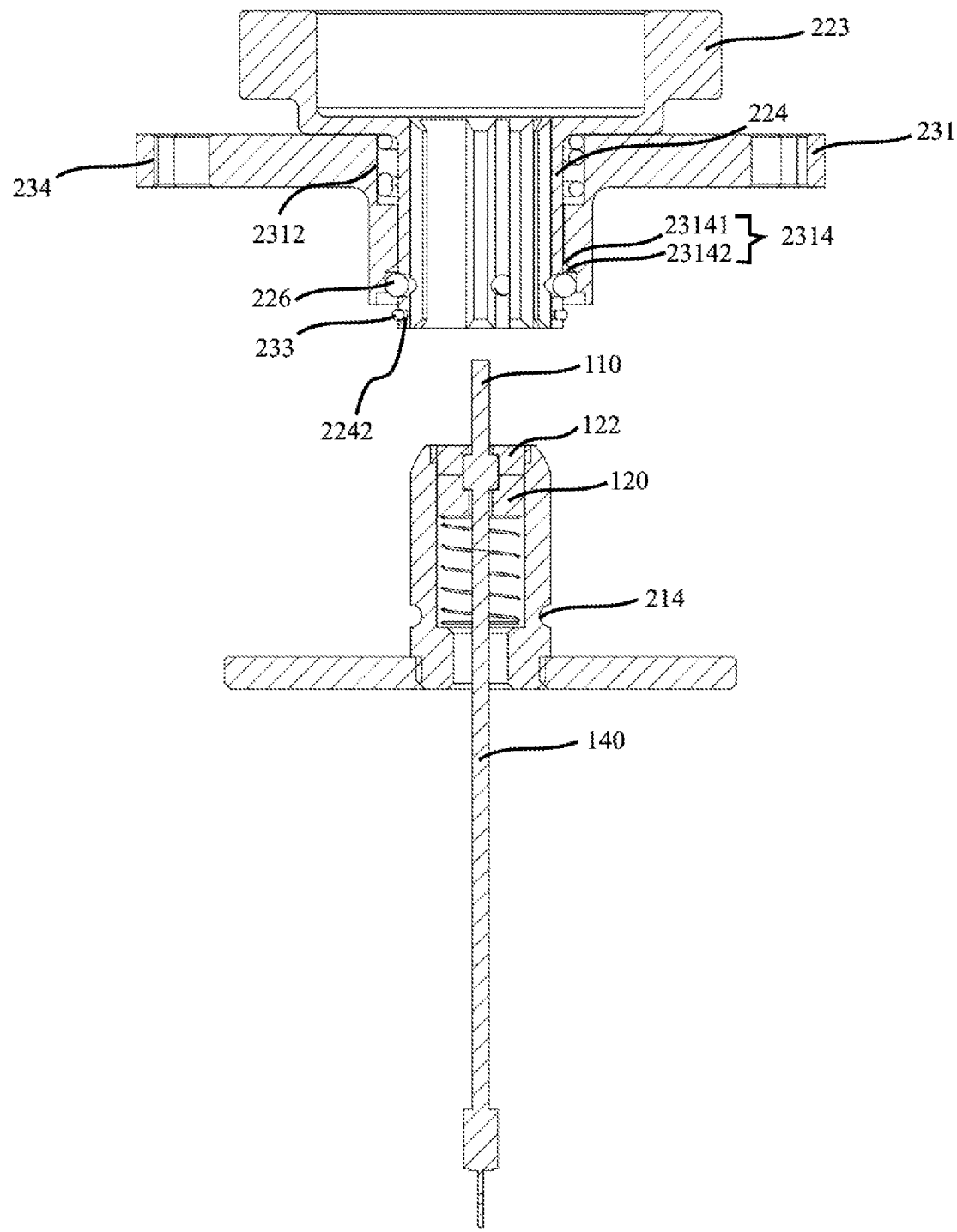
FIG. 3C illustrates a cross-sectional view with a horn adaptive electrical connection unit separate from a quick-release steering wheel assembly in another unlocked state.

FIG. 3B illustrates a cross-sectional view with a horn adaptive electrical connection unit and the unit installed in a quick-release steering wheel assembly in an unlocked state. FIG. 3C illustrates a cross-sectional view with a horn adaptive electrical connection unit separate from a quick-release steering wheel assembly in another unlocked state. When manually urged away the spring-loaded sliding release sleeve 230 from a steering shaft, the locking balls 226 are freed, thereby permitting movement away from the peripheral recess 214 wherein the locking balls 226 fully extend into the peripheral ball mounting holes 225 releasing the steering wheel adapter 220 from the steering shaft connection hub 210.

In a preferred embodiment, the number of locking balls 226 is 4, and the peripheral ball mounting holes 225 are evenly positioned on the same periphery.

In another embodiment, the hollow central shaft 213 is a hollow spline shaft with external spline teeth 215; the hollow cylinder portion 224 has corresponding internal spline teeth 227 coupled to the hollow spline shaft. The above configuration allows the components of the quick-release steering wheel assembly 20 to avoid relative motion along the circumference during use.

Figure 5A:
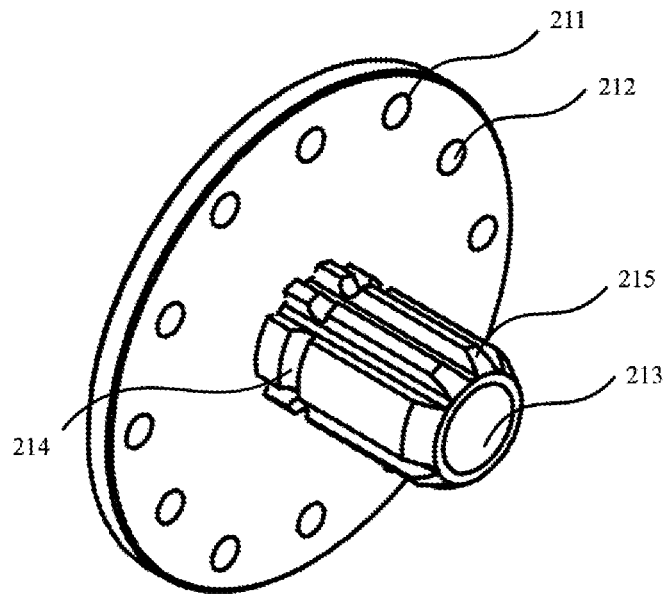
FIG. 5A and FIG. 5B illustrate a schematic view and a front view of the steering shaft connection hub.
Figure 5B:
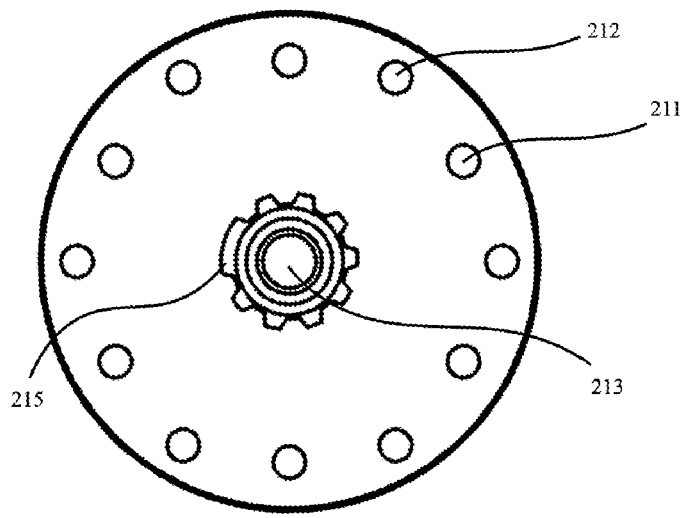

FIG. 5A and FIG. 5B illustrate a schematic view and a front view of the steering shaft connection hub.

In another embodiment, fool proofing setup is applied to ensures the correct loading of components, i.e., making it possible to keep the relative position of the steering wheel and the steering shaft consistent each time the steering wheel is quickly installed with the quick-release steering wheel assembly 20. At least one of the external spline teeth 215 has a different size than other external spline teeth 215. Accordingly, the hollow cylinder portion 224 has corresponding internal spline teeth 227.

In another embodiment, an operating disk 231 is provided at the upper portion of the spring-loaded sliding release sleeve 230 to facilitate user operation.

The portion of the operating disk 231 close to the hollow cylinder portion 224 of the steering wheel adapter 220 forms a first annular cavity 2312; a tension spring 232 is set in the first annular cavity 2312 with one end resting against the bottom surface of the disk portion 223 of the steering wheel adapter 220 and another end against the inner bottom surface of the first annular cavity 2312.

In another embodiment, the lower portion of the spring-loaded sliding release sleeve 230 forms a second annular cavity 2314 with a truncated cone cavity 23141 at the top and a cylindrical cavity 23142 at the bottom.

When the locking balls 226 are forced into the peripheral recess 214 of the hollow central shaft 213 and interface with the peripheral ball mounting holes 225 of the steering wheel adapter 220, the inner surface of the truncated cone cavity 23141 blocks the movement of the locking balls 226 leaving the peripheral ball mounting holes 225.

At this point, the spring-loaded sliding release sleeve 230 locks the steering shaft connection hub 210 and the steering wheel adapter 220. The user can control the steering of the vehicle with the steering wheel.

When manually urged away the spring-loaded sliding release sleeve 230 from the steering shaft, the inner surface of the truncated cone cavity 23141 slips away from the peripheral ball mounting holes 225, thus the locking balls 226 enter the cylindrical cavity 23142 at the bottom.

At this point, the spring-loaded sliding release sleeve 230 releases the steering wheel adapter 220 from the steering shaft connection hub 210. The user can control the steering of the vehicle with the steering wheel. This allows the user to detach or replace the steering wheel.

In another embodiment, the hollow cylinder portion 224 of the steering wheel adapter 220 has an annular recess 2242 on the outer wall of the portion adjacent to the cylindrical cavity 23142 of the spring-loaded sliding release sleeve 230; a locking clip 233 is provided in the annular recess 2242 to prevent the locking balls 226 from leaving the cylindrical cavity 23142.

In another embodiment, the operating disk 231 is provided with a plurality of weight reduction holes 234.

In another embodiment, the hollow central shaft 213 is detachable from the quick-release steering wheel assembly 210.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

Except as otherwise stated immediately above, nothing that has been stated or illustrated is intended or should be interpreted to cause a dedication of any component, step, feature, object, benefit, advantage, or equivalent to the public, regardless of whether it is recited in the claims.

The terms and expressions used herein have the ordinary meaning accorded to such terms and expressions in their respective areas, except where specific meanings have been set forth. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

What is claimed is:

1. A horn adaptive electrical connection unit for quick-release steering wheel assembly, which has a steering shaft connecting hub, a steering wheel adapter, and a spring-loaded sliding release sleeve for locking and releasing the steering shaft connecting hub and the steering wheel adapter, the horn adaptive electrical connection unit comprises:

a horn contact pole; wherein one end of the horn contact pole is for electrical connection to a horn button, another end of the horn contact pole is for electrical connection to an automotive horn circuit;

a contact pole holder that holds the horn contact pole; wherein the contact pole holder slides freely in a hollow central shaft of the steering shaft connecting hub;

a horn spring; wherein one end of the horn spring rests against a bottom of the contact pole holder, another end of the horn spring rests against an inner bottom surface of the hollow central shaft, wherein, the horn spring provides support for the contact pole holder as well as the horn contact pole, thus creating a floating electrical connection between the horn button and the automotive horn circuit and adapting to different thicknesses of horn buttons, the hollow central shaft comprises a stopper; the stopper is mounted on upper part within the hollow central shaft, and the horn contact pole is shaped as a stepped shaft, with a step set on the horn contact pole; the horn contact pole holder is provided with a holding cavity to accommodate one end of the step and hold the horn contact pole to synchronize movement with it; the stopper is provided with a central hole to rest against another end of the step and limit the movement of the horn contact pole the hollow central shaft.

2. The horn adaptive electrical connection unit of claim 1, wherein the steering wheel adapter and the steering shaft connecting hub are electrically conductive; another electrical connection from the horn button is transferred through the steering wheel adapter and the steering shaft connecting hub to the automotive horn circuit.

3. The horn adaptive electrical connection unit of claim 1, wherein portion of the horn contact pole in contact with the contact pole holder is provided with an insulating layer or insulating coating.

4. The horn adaptive electrical connection unit of claim 1, wherein the contact pole holder is made of insulating material.

5. The horn adaptive electrical connection unit of claim 1, wherein a horn signal wire provided an electrical connection between the automotive horn circuit and one end of the horn contact pole.

6. The horn adaptive electrical connection unit of claim 5, wherein outer surface of the horn signal wire is covered with insulating material.

7. The horn adaptive electrical connection unit of claim 1, wherein a first set of threaded holes for PCD bolt pattern of 6×70 mm and a second set of threaded holes for PCD bolt pattern of 6×74 mm are evenly distributed on the steering shaft connecting hub; threaded holes in same set are not adjacent to each other.

8. The horn adaptive electrical connection unit of claim 7, wherein a third set of threaded holes for PCD bolt pattern of 6×70 mm and a fourth set of threaded holes for PCD bolt pattern of 6×74 mm are evenly distributed on the steering wheel adapter; threaded holes in same set are not adjacent to each other.

9. The horn adaptive electrical connection unit of claim 1, wherein the hollow central shaft is fixed at center of the steering shaft connecting hub; the hollow central shaft has a peripheral recess;

the steering wheel adapter comprises a disk portion and a hollow cylinder portion extending from the disk portion; wherein upper surface of the disk portion is attached to a steering wheel; the hollow cylinder portion has a plurality of peripheral ball mounting holes therethrough, with the steering wheel adapter slidably engaging the steering shaft connecting hub; the disk portion is hollow to accommodate the horn button; hollow interiors of the disk portion and the hollow cylinder portion are connected;

locking balls with the same number as the peripheral ball mounting holes disposed within the peripheral ball mounting holes; and, the spring-loaded sliding release sleeve slidably extending over the steering wheel adapter, thereby retaining the locking balls such that when the spring-loaded sliding release sleeve is at rest under influence of spring loading, the locking balls are forced into the peripheral recess of the hollow central shaft and interface with the peripheral ball mounting holes of the steering wheel adapter, thus securely locking the steering wheel adapter to the steering shaft connecting hub, and when manually urged away the spring-loaded sliding release sleeve from a steering shaft, the locking balls are freed, thereby permitting movement away from the peripheral recess wherein the locking balls fully extend into the peripheral ball mounting holes releasing the steering wheel adapter from the steering shaft connecting hub.

10. The horn adaptive electrical connection unit of claim 9, wherein number of locking balls is 4, the peripheral ball mounting holes are evenly positioned on a same periphery.

11. The horn adaptive electrical connection unit of claim 9, wherein the hollow central shaft is a hollow spline shaft with external spline teeth; the hollow cylinder portion has corresponding internal spline teeth coupled to the hollow spline shaft.

12. The horn adaptive electrical connection unit of claim 11, wherein at least one of the external spline teeth has a different size than other external spline teeth.

13. The horn adaptive electrical connection unit of claim 9, wherein an operating disk is provided at upper portion of the spring-loaded sliding release sleeve.

14. The horn adaptive electrical connection unit of claim 13, wherein portion of the operating disk close to the hollow cylinder portion of the steering wheel adapter forms a first annular cavity; a tension spring is set in the first annular cavity with one end resting against bottom surface of the disk portion of the steering wheel adapter and another end against inner bottom surface of the first annular cavity.

15. The horn adaptive electrical connection unit of claim 13, wherein the operating disk is provided with a plurality of weight reduction holes.

16. The horn adaptive electrical connection unit of claim 9, wherein lower portion of the spring-loaded sliding release sleeve forms a second annular cavity with a truncated cone cavity at top and a cylindrical cavity at bottom; and when the locking balls are forced into the peripheral recess of the hollow central shaft and interface with the peripheral ball mounting holes of the steering wheel adapter, inner surface of the truncated cone cavity blocks the movement of the locking balls leaving the peripheral ball mounting holes; when manually urged away the spring-loaded sliding release sleeve from the steering shaft, the inner surface of the truncated cone cavity slips away from the peripheral ball mounting holes, thus the locking balls enter the cylindrical cavity at the bottom.

17. The horn adaptive electrical connection unit of claim 16, wherein the hollow cylinder portion of the steering wheel adapter has an annular recess on outer wall of portion adjacent to the cylindrical cavity of the spring-loaded sliding release sleeve; a locking clip is provided in the annular recess to prevent the locking balls from leaving the cylindrical cavity.

18. The horn adaptive electrical connection unit of claim 9, wherein the hollow central shaft is detachable from the steering shaft connecting hub.

\* \* \* \* \*